(12) United States Patent
Tseng et al.

(10) Patent No.: US 8,876,545 B2
(45) Date of Patent: Nov. 4, 2014

(54) TRANSMISSION CONNECTOR MODULE CONTAINABLE INSIDE A CASING OF A ELECTRONIC DEVICE IN A DETACHABLE MANNER OR IN A ROTABLE MANNER

(71) Applicant: Wistron Corporation, New Taipei (TW)

(72) Inventors: Tien-Chung Tseng, New Taipei (TW); Ming-Ju Hsieh, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 23 days.

(21) Appl. No.: 13/775,085

(22) Filed: Feb. 22, 2013

(65) Prior Publication Data
US 2013/0323981 A1 Dec. 5, 2013

(30) Foreign Application Priority Data
May 31, 2012 (TW) .............................. 101119501 A

(51) Int. Cl.
*H01R 13/64* (2006.01)
*H01R 31/06* (2006.01)
*G06F 1/16* (2006.01)

(52) U.S. Cl.
CPC .............. *H01R 31/06* (2013.01); *H01R 31/065* (2013.01); *H01R 2201/06* (2013.01); *G06F 1/1632* (2013.01)
USPC ......................................................... 439/376

(58) Field of Classification Search
USPC ........................... 439/376, 134–136, 638, 341
See application file for complete search history.

(56) References Cited

U.S. PATENT DOCUMENTS

| 7,411,784 | B2 | | 8/2008 | Coglitore |
| 7,556,521 | B2 | * | 7/2009 | Abram ........................... 439/341 |
| 7,762,817 | B2 | * | 7/2010 | Ligtenberg et al. .............. 439/38 |
| 7,815,464 | B2 | * | 10/2010 | Kim ................................. 439/490 |
| 7,931,494 | B2 | * | 4/2011 | Long .............................. 439/527 |
| 8,007,309 | B2 | * | 8/2011 | Fan ................................. 439/376 |
| 8,636,525 | B2 | * | 1/2014 | Sobig et al. .................... 439/136 |
| 2013/0141855 | A1 | * | 6/2013 | Tseng et al. ............. 361/679.09 |

* cited by examiner

*Primary Examiner* — Chandrika Prasad
(74) *Attorney, Agent, or Firm* — Winston Hsu; Scott Margo

(57) ABSTRACT

A transmission port module adapted to an electronic device is disclosed. The electronic device includes a casing whereon a containing slot is formed. According to an embodiment, the transmission port module includes at least one transmission port and a housing covering the at least one transmission port. The housing is installed inside the containing slot in a detachable manner, such that the at least one transmission port is hidden inside the casing as being not in use by detachment and installation of the housing. According to another embodiment, the transmission port module includes at least one transmission port and a rotational holder. The rotational holder holds the at least one transmission port and drives the at least one transmission port to rotate relative to the casing, such that the at least one transmission port is hidden inside the casing as being not in use by rotation of the rotational holder.

18 Claims, 11 Drawing Sheets

TRANSMISSION CONNECTOR MODULE CONTAINABLE INSIDE A CASING OF A ELECTRONIC DEVICE IN A DETACHABLE MANNER OR IN A ROTABLE MANNER

BACKGROUND OF THE INVENTION

1. Field of the Invention

The present invention relates to a transmission port module, and more particularly, to a transmission port module containable inside a casing of an electronic device in a detachable manner or in a rotable manner.

2. Description of the Prior Art

Generally speaking, a notebook computer is equipped with a transmission port module and a plurality of transmission ports, such as a power supply port, an audio jack, a Micro Universal Serial Bus, Micro USB, a High Definition Multimedia Interface, HDMI, and an Ethernet port, for transmitting signals with an external electronic device, so as to enhance flexibility of the notebook computer in use.

A conventional transmission port module is disposed on a side, such as a back side or a lateral side, of a host module of the notebook computer. However, no matter the transmission port module is disposed on the back side or on the lateral side of the host module of the notebook computer, the transmission port module is exposed on a host casing of the notebook computer, and thus it reduces aesthetic feeling of the notebook computer. In addition, since the conventional transmission port module is fixed on the host module of the notebook computer, the transmission port module can not be contained inside the host casing as being not in use. Accordingly, objects, such as dusts, are attached to the transmission port module or enter the host module from the transmission port module, so as to damage internal components of the host module and thus cause the notebook computer to function abnormally.

SUMMARY OF THE INVENTION

The present invention provides a transmission port module containable inside a casing of an electronic device in a detachable manner or in a rotable manner for solving above drawbacks.

According to the claimed invention, a transmission port module adapted to an electronic device with a casing whereon a containing slot is formed is disclosed. The transmission port module includes at least one transmission port and a housing. The at least one transmission port is for transmitting signals with a circuit board disposed inside the casing. The housing covers the at least one transmission port, and the housing has a first side whereon the at least one transmission port is exposed and a second side. The housing is installed inside the containing slot in a detachable manner, such that the at least one transmission port is exposed on the casing when the housing is installed inside the containing slot with the first side oriented towards outside of the casing, or such that the at least one transmission port is hidden inside the containing slot when the housing is installed inside the containing slot with the second side oriented towards outside of the casing.

According to the claimed invention, the transmission port module further includes an integrated circuit board disposed inside the housing for being coupled to the at least one transmission port.

According to the claimed invention, the transmission port module further includes a connecting contact and a transmission cable. The connecting contact is coupled to the integrated circuit board and disposed on a third side of the housing. The transmission cable is disposed inside the containing slot. A first end of the transmission cable is coupled to the circuit board, and a second end of the transmission cable is coupled to the connecting contact when the housing is installed inside the containing slot with the first side oriented towards outside of the casing, so as to be electrically connected to the circuit board, the integrated circuit board and the at least one transmission port.

According to the claimed invention, the transmission cable includes a first connecting contact and a second connecting contact. The first connecting contact is disposed on the first end, and the first connecting contact is coupled to the circuit board in an inserting manner. The second connecting contact is disposed on the second end, and the second connecting contact is coupled to the connecting contact in a tightly contacted manner.

According to the claimed invention, the first connecting contact and the second connecting contact are respectively a gold finger contact, and the connecting contact is a spring-armed connecting contact.

According to the claimed invention, the first end of the transmission cable is soldered to the circuit board. The transmission cable includes a gold finger contact disposed on the second end, the connecting contact is a spring-armed connecting contact, and the gold finger contact is coupled to the spring-armed contact in a tightly contacted manner.

According to the claimed invention, the transmission cable includes a circuit board connecting portion, a contact connecting portion and a bridging portion. The circuit board connecting portion extends from the first end, and the contact connecting portion extends from the second end. The contact connecting portion is attached to a side of the containing slot corresponding to the connecting contact. The bridging portion is connected to the circuit board connecting portion and the contact connecting portion, and the bridging portion is disposed on a lateral side of the containing slot along the housing.

According to the claimed invention, the transmission cable is a flexible printed circuit.

According to the claimed invention, the at least one transmission port includes a power supply port, an audio jack, a Micro Universal Serial Bus, a High Definition Multimedia Interface or an Ethernet port.

According to the claimed invention, a transmission port module adapted to an electronic device with a casing whereon a containing slot is formed is disclosed. The transmission port module includes at least one transmission port and a rotably holding member. The at least one transmission port is for transmitting signals with a circuit board disposed inside the casing. The rotably holding member is pivoted to the casing in a position corresponding to an opening of the containing slot. The rotably holding member is for holding the at least one transmission port and rotates the at least one transmission port relative to the casing, such that the at least one transmission port is exposed towards outside of the casing when the rotably holding member rotates to an in-use position, or such that the at least one transmission port is hidden inside the containing slot when the rotably holding member rotates to a containing position.

According to the claimed invention, the transmission port module further includes an integrated circuit board coupled to the at least one transmission port. The integrated circuit board is engaged with the rotably holding member, such that the rotably holding member holds the at least one transmission port and rotates the at least one transmission port relative to the casing.

According to the claimed invention, the transmission port module further includes a connecting contact and a transmission cable. The connecting contact is coupled to the integrated circuit board. The transmission cable is disposed inside the containing slot. A first end of the transmission cable is coupled to the circuit board, and a second end of the transmission cable is coupled to the connecting contact, so as to be electrically connected to the circuit board, the integrated circuit board and the at least one transmission port.

According to the claimed invention, the transmission port module further includes a first connecting contact and a second connecting contact. The first connecting contact disposed on the first end, and the first connecting contact is coupled to the circuit board in an inserting manner. The second connecting contact is disposed on the second end, and the second connecting contact is coupled to the connecting contact in an inserting manner.

According to the claimed invention, the first connecting contact and the second connecting contact are respectively a gold finger contact.

According to the claimed invention, the first end of the transmission cable is soldered to the circuit board, and the second end of the transmission cable is soldered to the connecting contact.

According to the claimed invention, the transmission port module further includes a pivotal shaft member fixed on the rotably holding member for pivoting the rotably holding member to the casing.

According to an embodiment, the transmission port of the transmission port module of the present invention is disposed inside the housing, and the housing is detachably installed inside the containing slot on the casing of the electronic device. When the transmission port of the transmission port module is in use, the housing is installed inside the containing slot with the transmission port oriented towards outside of the casing of the electronic device, i.e. the first side oriented towards outside of the casing. Accordingly, the transmission port of the transmission port module is exposed on the casing for a user to use. When the transmission port of the transmission port module is not in use, the housing is installed inside the containing slot with the transmission port oriented towards inside of the casing of the electronic device, i.e. the second side oriented towards outside of the casing. Accordingly, the transmission port of the transmission port module is hidden inside the casing.

According to another embodiment, the transmission port of the transmission port module is held on the rotably holding member, and the rotably holding member is pivoted to the casing in the position corresponding to the opening of the containing slot. When the transmission port of the transmission port module is in use, the rotably holding member rotates to the in-use position. At the same time, the transmission port of the transmission port module is exposed on the casing for a user to use. When the transmission port of the transmission port module is not in use, the rotably holding member rotates to the containing position. At the same time, the transmission port of the transmission port module is hidden inside the casing.

In summary, the transmission port of the transmission port module of the present invention is capable of being contained inside the casing in a detachable or rotable manner as being not in sue, so as to keep appearance integrity of the casing of the electronic device. Accordingly, it can enhance aesthetic feeling of the electronic device and further prevent objects, such as dusts from being attached to the transmission port or entering the electronic device from the transmission port. As a result, it can prevent internal components of the electronic device from damage and keep the electronic device function normally.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
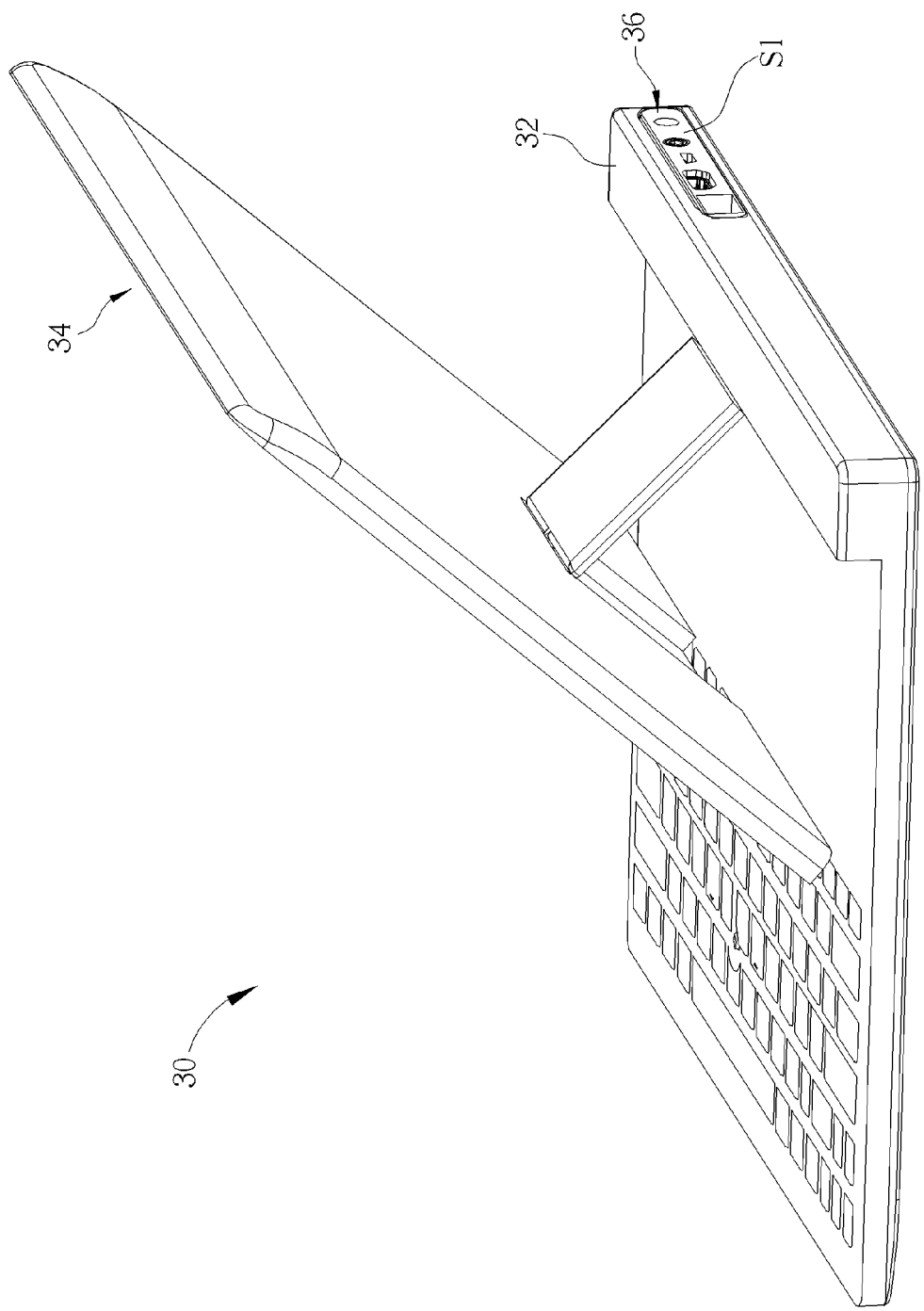
FIG. 1 is a schematic diagram of an electronic device according to a first embodiment of the invention.

Please refer to FIG. 1. FIG. 1 is a schematic diagram of an electronic device 30 according to a first embodiment of the invention. As shown in FIG. 1, the electronic device 30 includes a casing 32 for covering internal components, such as a circuit board, cables and so on, of the electronic device 30. In this embodiment, the electronic device 30 is an external keyboard module adapted to a portable electronic device 34, such as a tablet computer. The implementation of the electronic device 30 is not limited to that mentioned above. For example, the electronic device 30 can also be a notebook computer, a personal digital assistant, a desktop computer and so on. As for which one of the above-mentioned designs is adopted, it depends on practical demands.

Figure 2:
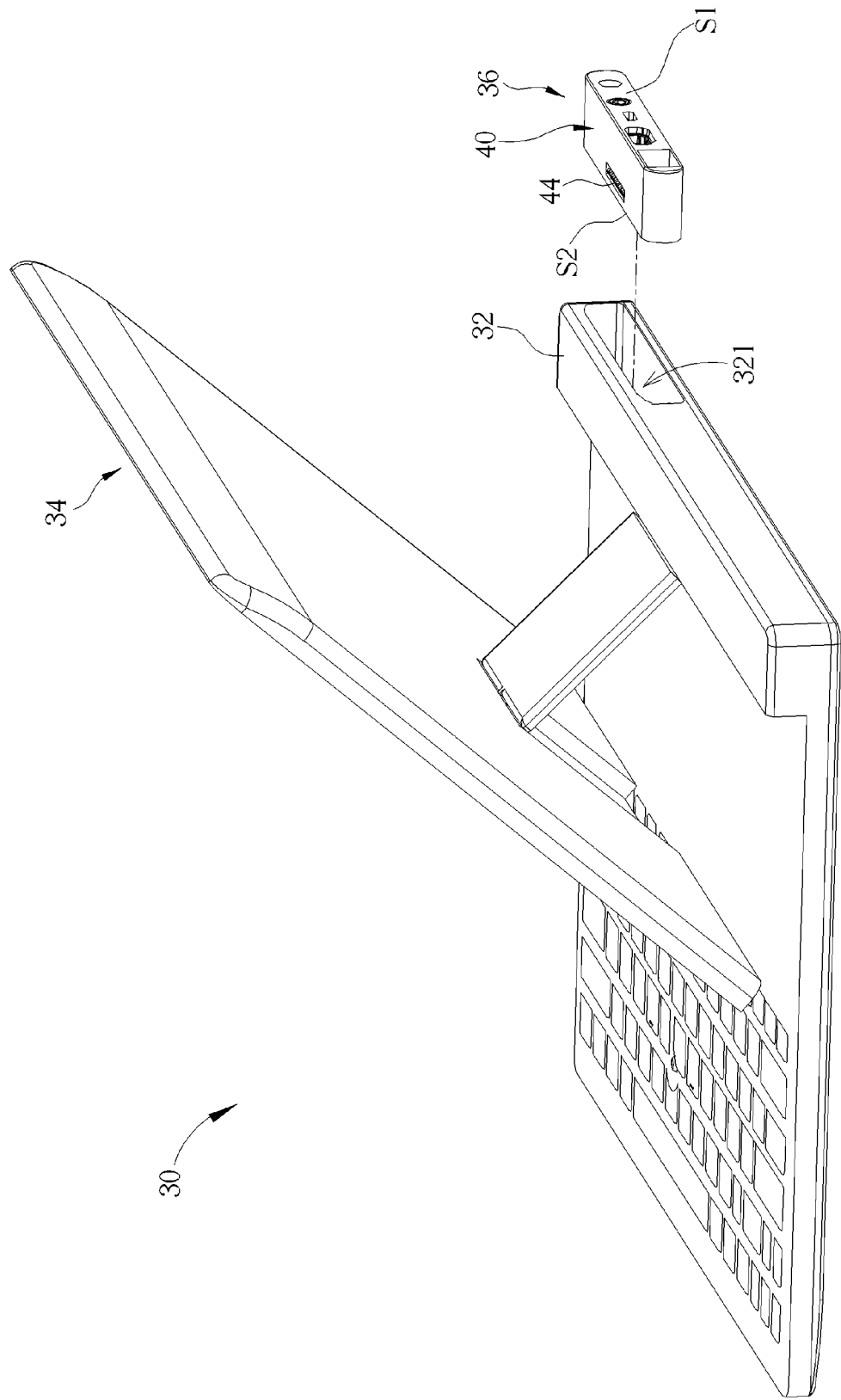
FIG. 2 is a partly exploded diagram of the electronic device according to the first embodiment of the invention.
Figure 3:
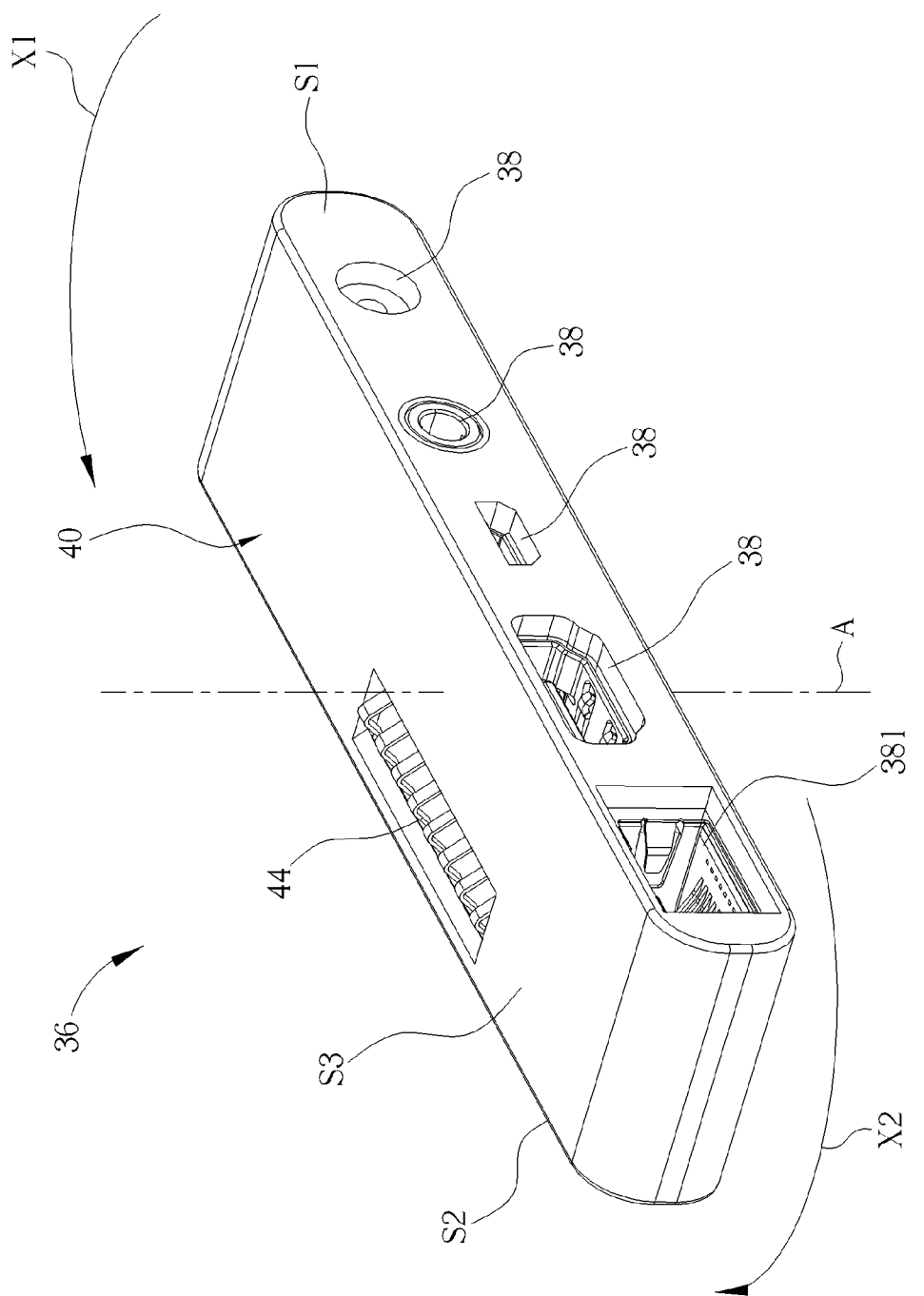
FIG. 3 is a diagram of a transmission port module according to the first embodiment of the invention.

Please refer to FIG. 1 and FIG. 2. FIG. 2 is a partly exploded diagram of the electronic device 30 according to the first embodiment of the invention. As shown in FIG. 1 and FIG. 2, the electronic device 30 further includes a transmission port module 36, and a containing slot 321 is formed on the casing 32 for containing the transmission port module 36. Please refer to FIG. 2 and FIG. 3. FIG. 3 is a diagram of the transmission port module 36 according to the first embodiment of the invention. As shown in FIG. 2 and FIG. 3, the transmission port module 36 includes five transmission ports 38, which are a power supply port, an audio jack, a Micro Universal Serial Bus (Micro USB), a High Definition Multimedia Interface (HDMI) and an Ethernet port, respectively. The transmission port 38 can be an electrical connector, a contact, a terminal, and so on. An amount and variety of the transmission port 38 of the transmission port module 36 is not limited to those illustrated in this embodiment, and it depends on practical demands.

In addition, the transmission port module 36 further includes a housing 40 for covering the transmission ports 38. A shape of the housing 40 of the transmission port module 36 is substantially identical to a contour of the containing slot 321 on the casing 32, and the housing 40 has a first side S1 and a second side S2 opposite to the first side S1. In this embodiment, the transmission ports 38 are exposed on the first side S1, as shown in FIG. 3, and the housing 40 is installed inside the containing slot 321 on the casing 32 in a detachable manner, as shown in FIG. 1 and FIG. 2. Furthermore, the housing 40 of the transmission port module 36 is a substantially axially symmetric structure. In other words, when the housing 40 is rotated about an axis A shown in FIG. 3 by 180 degrees, the shape of the housing 40 before rotation is substantially identical to the shape of the housing 40 after rotation.

Figure 4:
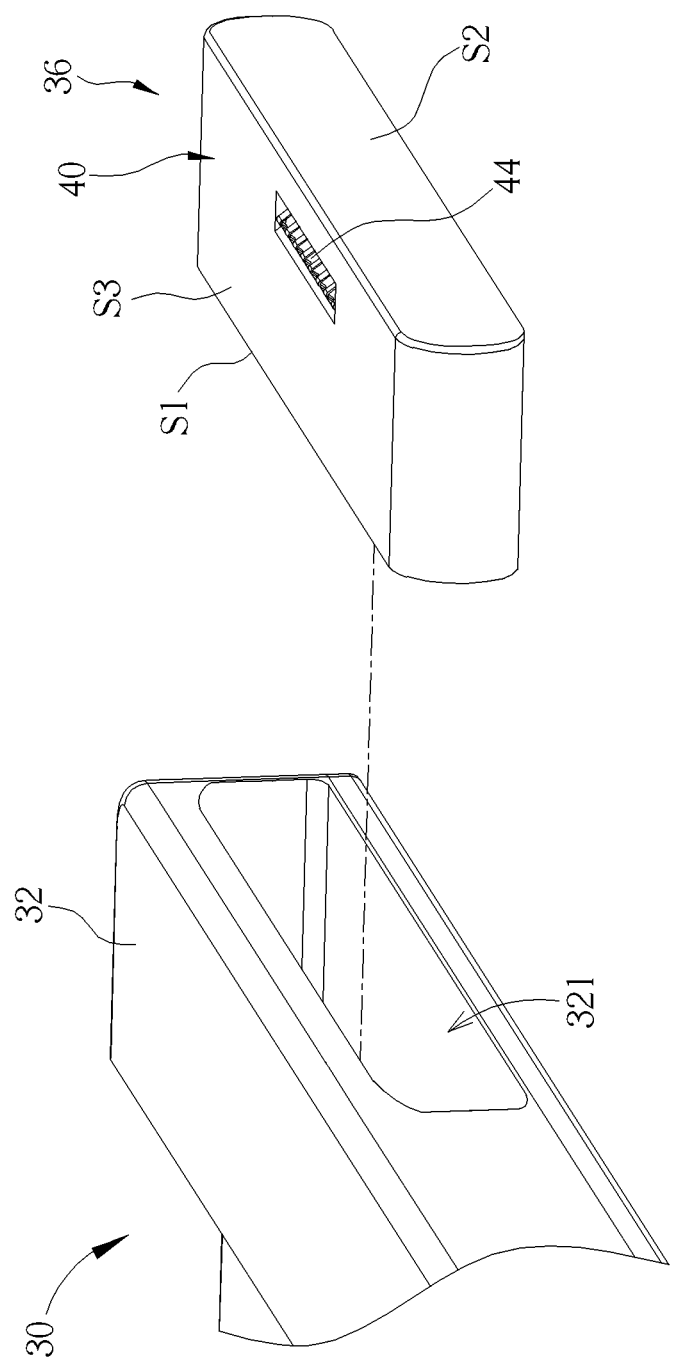
FIG. 4 is a partly exploded diagram of the transmission port module and the electronic device in another status according to the first embodiment of the invention.
Figure 5:
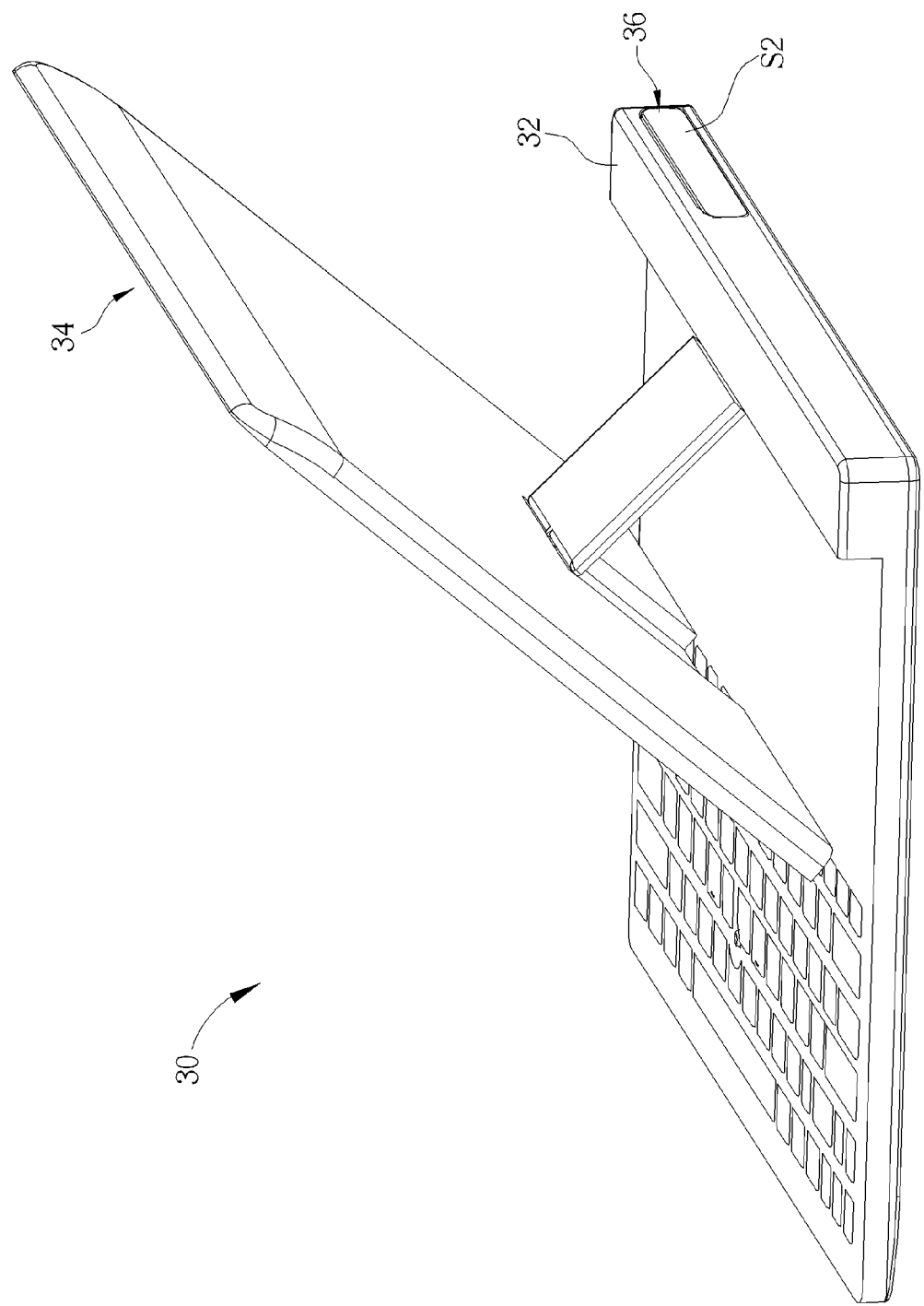
FIG. 5 is a schematic diagram of the electronic device in another status according to the first embodiment of the invention.

Please refer to FIG. 3 to FIG. 5. FIG. 4 is a partly exploded diagram of the transmission port module 36 and the electronic device 30 in another status according to the first embodiment of the invention. FIG. 5 is a schematic diagram of the electronic device 30 in another status according to the first embodiment of the invention. As shown in FIG. 3 to FIG. 5, when the transmission port module 36 is rotated about the axis A in FIG. 3 from a status shown in FIG. 3 to a status shown in FIG. 4 in a first direction X1 or in a second direction X2 opposite to the first direction X1, i.e. when the transmission port module 36 is rotated by 180 degrees from the status shown in FIG. 3 in the first direction X1 or in the second direction X2, the shape of the housing 40 that the transmission port module 36 is in the status shown in FIG. 3 is substantially identical to the shape of the housing 40 that the transmission port module 36 is in the status shown in FIG. 4 since the housing 40 of the transmission port module 36 is substantially axially symmetric as mentioned above.

Thus, both of the housing 40 of the transmission port module 36 in the status shown in FIG. 3 and the housing 40 of the transmission port module 36 in the status shown in FIG. 4 can be installed inside the containing slot 321 on the casing 32. Accordingly, the transmission ports 38 can be installed inside the containing slot 321 on the casing 32 with the first side S1 oriented towards outside of the casing 32, such that the transmission ports 38 disposed on the first side S1 can be exposed on the casing 32, as shown in FIG. 1. Alternatively, the transmission ports 38 can be installed inside the containing slot 321 on the casing 32 with the second side S2 oriented towards outside of the casing 32, such that the transmission ports 38 disposed on the first side S1 can be hidden inside the containing slot 321 on the casing 32, as shown in FIG. 5.

In summary, when the transmission ports 38 of the transmission port module 36 are in use, the housing 40 of the transmission port module 36 is installed inside the containing slot 321 with the first side S1 oriented towards outside of the casing 32 of the electronic device 30. In such a manner, the transmission ports 38 of the transmission port module 36 can be exposed on the casing 32, such that the electronic device 30 can be coupled to other external electronic devices by the transmission ports 38. When the transmission ports 38 of the transmission port module 36 are not in use, first of al, the housing 40 of the transmission port module 36 is pulled from the containing slot 321 on the casing 32 of the electronic device 30, i.e. in the status shown in FIG. 1, to the status shown in FIG. 2. Then, the housing 40 is rotated in the first direction X1 or in the second direction X2 from the status in FIG. 3 to the status in FIG. 4. Finally, the transmission port module 36 with the status shown in FIG. 4 is installed inside the containing slot 321. At the same time, the housing 40 of the transmission port module 36 is installed inside the containing slot 321 with the second side S2 oriented towards outside of the casing 32 of the electronic device 30.

In such a manner, the transmission ports 38 can be hidden inside the containing slot 321, as shown in FIG. 5, so as to keep appearance integrity of the casing 32 of the electronic device 30. Accordingly, it can enhance aesthetic feeling of the electronic device 30 and further prevent objects, such as dusts, from being attached to the transmission ports 38 or entering the electronic device 30 from the transmission ports 38, so as to prevent damage of internal components of the electronic device 30 and keep the electronic device 30 to function normally.

Figure 6:
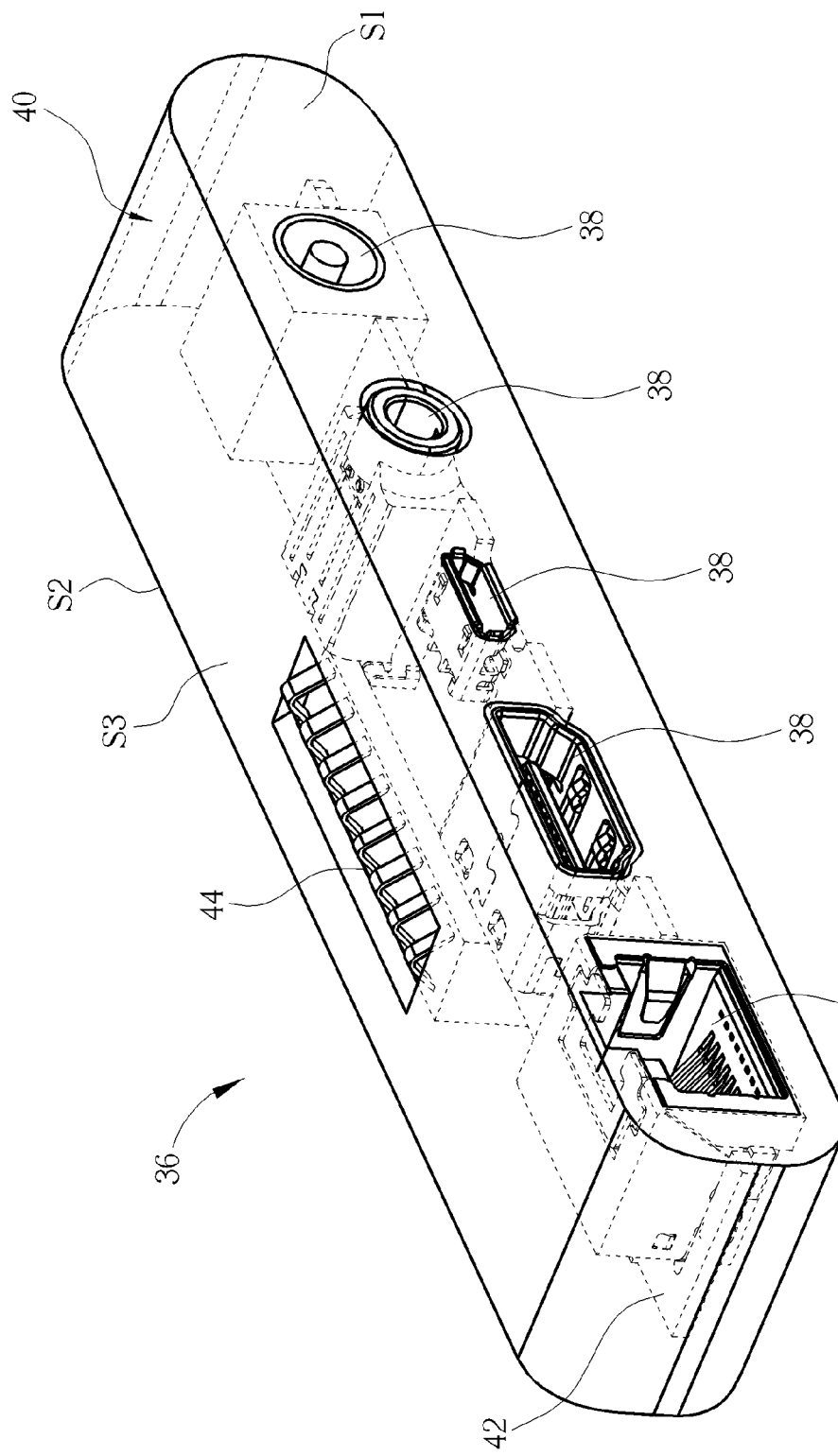
FIG. 6 is an internal diagram of the transmission port module according to the first embodiment of the invention.

Please refer to FIG. 6. FIG. 6 is an internal diagram of the transmission port module 36 according to the first embodiment of the invention. As shown in FIG. 6, the transmission port module 36 further includes an integrated circuit board 42 and a connecting contact 44. The integrated circuit board 42 is disposed inside the housing 40, and the connecting contact 44 is disposed on a third side S3 of the housing 40. In this embodiment, the third side S3 can be, but not limited to, a top side of the housing 40. For example, the third side S3 can be a bottom side of the housing 40 as well. As for which one of the above-mentioned designs is adopted, it depends on practical demands. Furthermore, the integrated circuit board 42 is used for being coupled to the transmission ports 38 and the connecting contact 44, such that the transmission ports 38 can be coupled to the external components, such as cables, connectors and so on, via the integrated circuit board 42 and the connecting contact 44.

Figure 7:
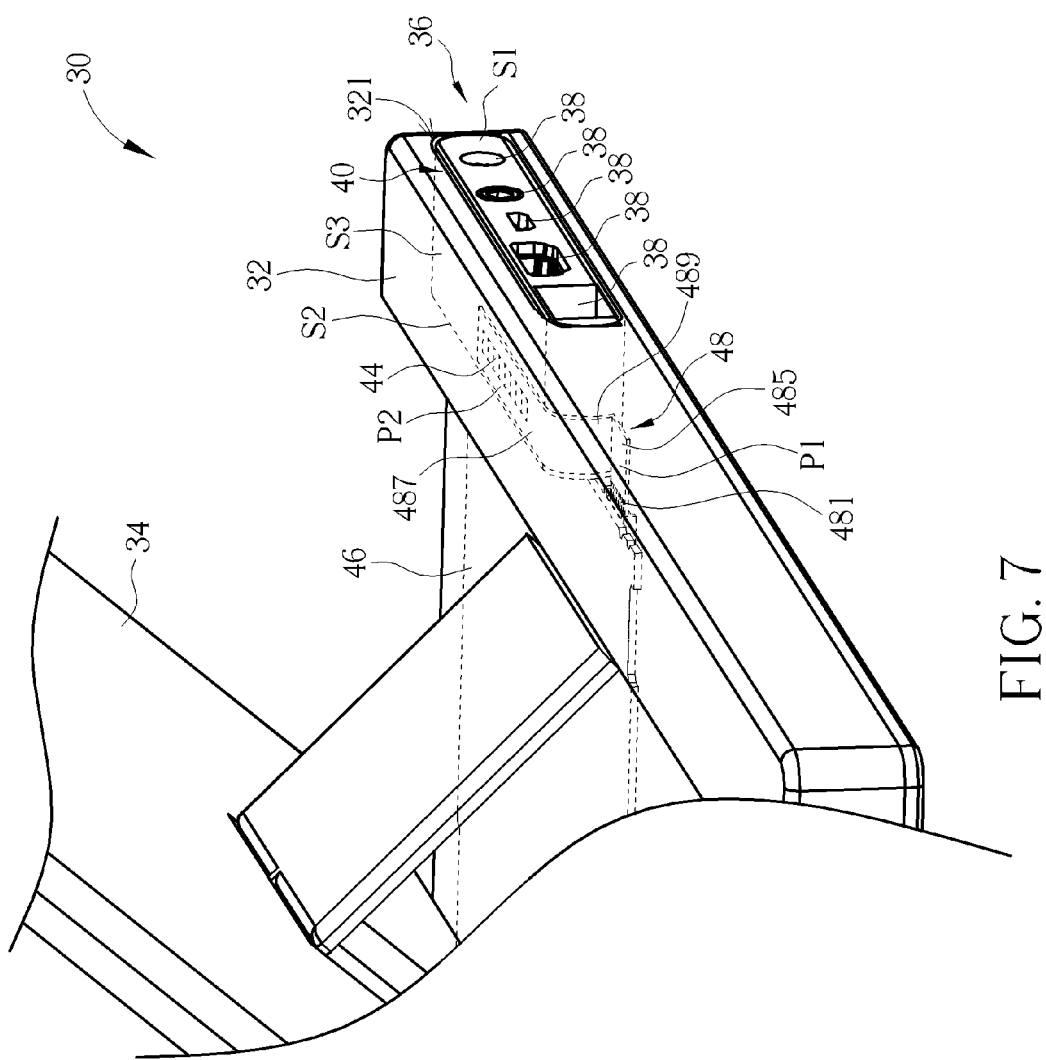
FIG. 7 is an internal diagram of the electronic device according to the first embodiment of the invention.
Figure 8:
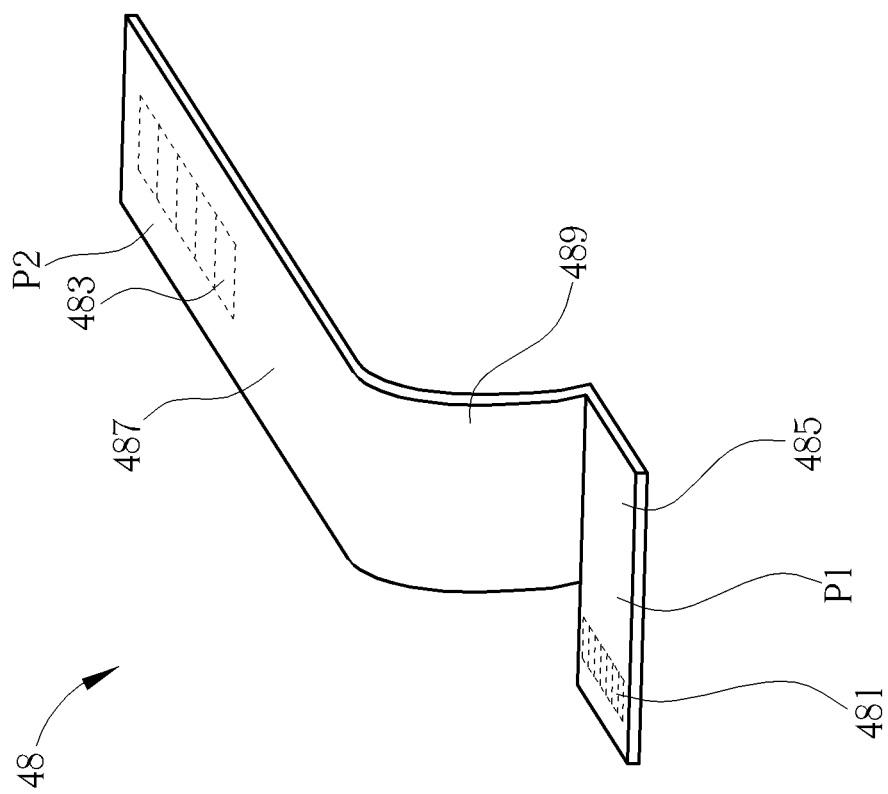
FIG. 8 is a diagram of a transmission cable according to the first embodiment of the invention.

Please refer to FIG. 7. FIG. 7 is an internal diagram of the electronic device 30 according to the first embodiment of the invention. As shown in FIG. 7, the electronic device 30 further includes a circuit board 46 disposed inside the casing 32. In this embodiment, the circuit board 46 is a main board for processing signals between the electronic device 30 and the portable electronic device 34. Accordingly, it can help a user to perform affairs, such as documentation, instruction input and so on, by the electronic device 30. In addition, the transmission port module 36 further includes a transmission cable 48 disposed inside the containing slot 321 on the casing 32. Please refer to FIG. 7 and FIG. 8. FIG. 8 is a diagram of the transmission cable 48 according to the first embodiment of the invention. As shown in FIG. 7 and FIG. 8, the transmission cable 48 has a first end P1 and a second end P2 opposite to the first end P1. A first end P1 of the transmission cable 48 is coupled to the circuit board 46. When the housing 40 of the transmission port module 36 is installed inside the containing slot 321 on the casing 32 with the side S1 oriented towards outside of the casing 32 of the electronic device 30, the second end P2 of the transmission cable 48 is coupled to the connecting contact 44.

As mentioned above, since the first end P1 of the transmission cable 48 is coupled to the circuit board 46 and the transmission ports 38 of the transmission port module 36 are coupled to the connecting contact 44 by the integrated circuit board 42, the transmission ports 38 of the transmission port module 36 can be coupled to the circuit board 46 of the electronic device 30 via the integrated circuit board 42, the connecting contact 44 and the transmission cable 48 in sequence when the housing 40 of the transmission port module 36 is installed inside the containing slot 321 with the side S1 oriented towards outside of the casing 32 of the electronic device 30 for coupling the second end P2 of the transmission cable 48 to the connecting contact 44. In other words, when the housing 40 of the transmission port module 36 is installed inside the containing slot 321 with the side S1 oriented towards outside of the casing 32 of the electronic device 30, the transmission cable 48 is used for coupling the circuit board 46 and the transmission ports 38, such that the signals can be transmitted between the transmission cable 48 and the circuit board 46 disposed inside the casing 32. Accordingly, the electronic device 30 can be coupled to an external electronic device, so as to enhance flexibility of the electronic device 30.

As shown in FIG. 7 and FIG. 8, the transmission cable 48 can include a first connecting contact 481 and a second connecting contact 483. The first connecting contact 481 is disposed on the first end P1 of the transmission cable 48, and the second connecting contact 483 is disposed on the second end P2 of the transmission cable 48. In this embodiment, the first connecting contact 481 and the second connecting contact 483 are respectively a gold finger contact, and the connecting contact 44 of the transmission port module 36 is a spring-armed connecting contact. The first connecting contact 481 of the transmission cable 48 is coupled to the circuit board 46 of the electronic device 30 in an inserting manner during assembly. Furthermore, the second connecting contact 483 of the transmission cable 48 presses the connecting contact 44 of the transmission port module 36 when the housing 40 of the transmission port module 36 is installed inside the containing slot 321 with the side S1 oriented towards outside of the casing 32 of the electronic device 30, such that the second connecting contact 483, i.e. the gold finger contact, of the transmission cable 48 is coupled to the connecting contact 44 of the transmission port module 36 in a tightly contacted manner. In this embodiment, the transmission cable 48 is a Flexible Printed Circuit, FPC.

The way to couple the transmission cable 48 and the circuit board 46 is not limited to those mentioned in this embodiment. For example, the first end P1 of the transmission cable 48 can be soldered to the circuit board 46 as well. Accordingly, the transmission cable 48 can omit the first connecting contact 481. In other words, the first connecting contact 481 can be omitted in this embodiment for saving cost of manufacture. As for which one of the above-mentioned designs is adopted, it depends on practical demands.

As shown in FIG. 7 and FIG. 8, the transmission cable 48 can further include a circuit board connecting portion 485, a contact connecting portion 487 and a bridging portion 489. The circuit board connecting portion 485 extends from the first end P1 of the transmission cable 48, the contact connecting portion 487 extends from the second end P2 of the transmission cable 48, and the bridging portion 489 is connected to the circuit board connecting portion 485 and the contact connecting portion 487. When the transmission cable 48 is installed inside the containing slot 321 on the casing 32, the circuit board connecting portion 485 is attached to a side of the containing slot 321 corresponding to the connecting contact 44. In other words, the contact connecting portion 487 is attached to a side of the containing slot 321 corresponding to the third side S3 of the housing 40 of the transmission port module 36, and the bridging portion 489 is disposed on a lateral side of the containing slot 321 along the housing 40 of the transmission port module 36.

In other words, the contact connecting portion 487 and the bridging portion 489 of the transmission cable 48 are attached to a periphery of the containing slot 321 on the casing 32 corresponding to the shape of the housing 40 of the transmission port module 36, respectively, so as to allow the containing slot 321 to have sufficient space. In such a manner, the transmission port module 36 can be installed inside the containing slot 321 more smoothly, or be detached from the containing slot 321 more smoothly. Shapes of the circuit board connecting portion 485, the contact connecting portion 487 and the bridging portion 489 of the transmission cable 48 are not limited to those illustrated in this embodiment, and it depends on practical demands.

Figure 9:
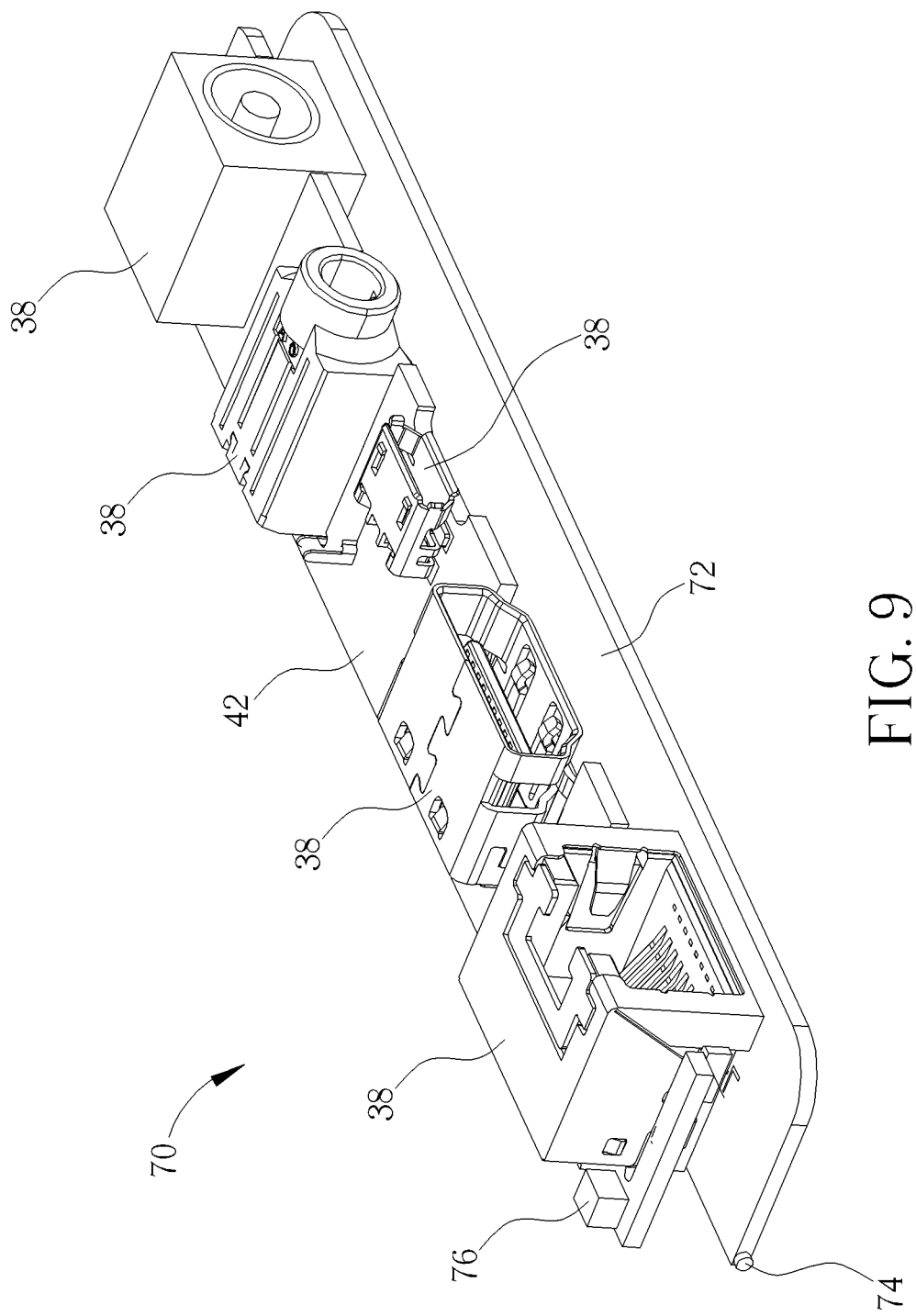
FIG. 9 is a diagram of a transmission port module according to a second embodiment of the invention.
Figure 10:
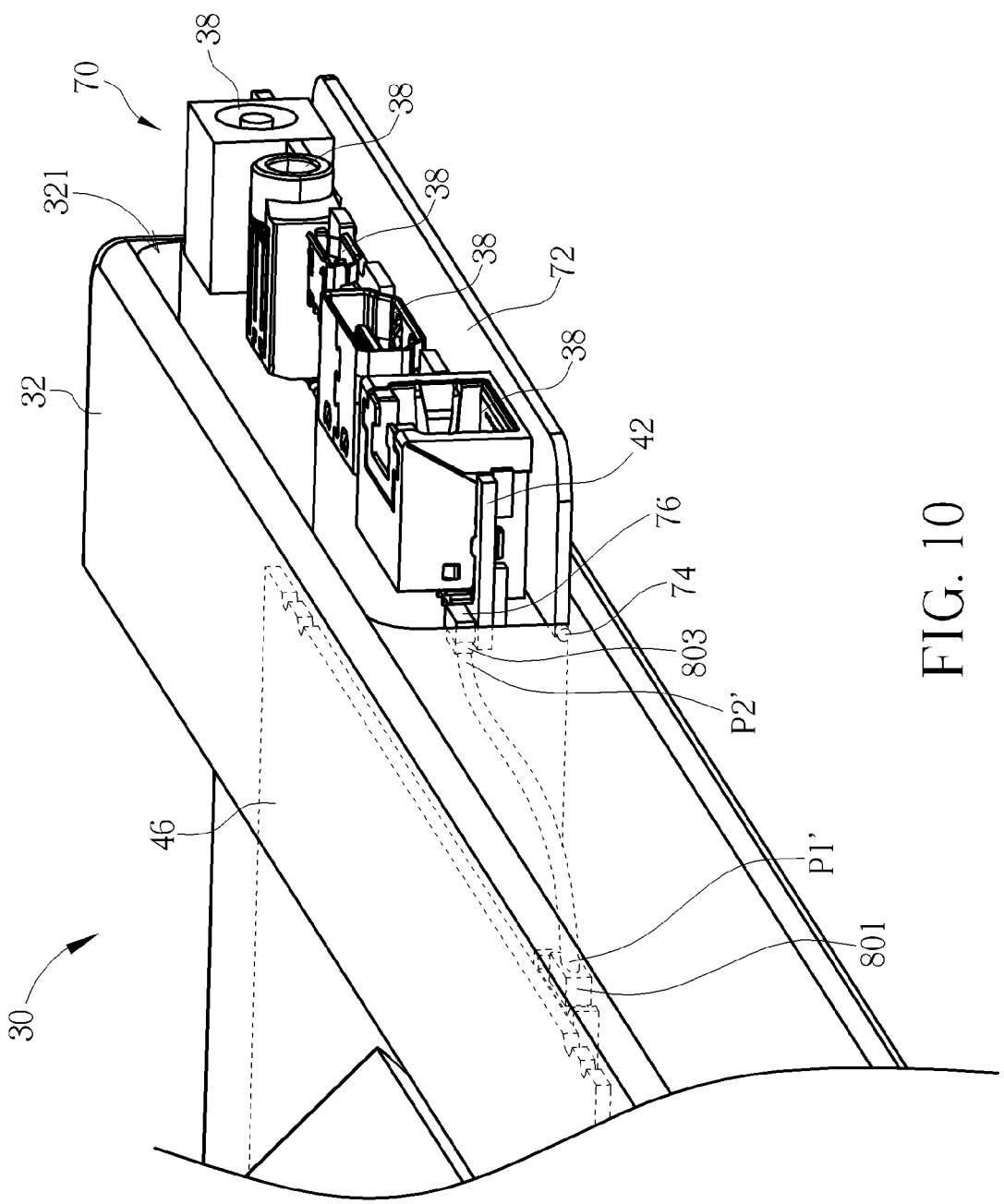
FIG. 10 is a diagram of the transmission port module in an in-use status according to the second embodiment of the invention.
Figure 11:
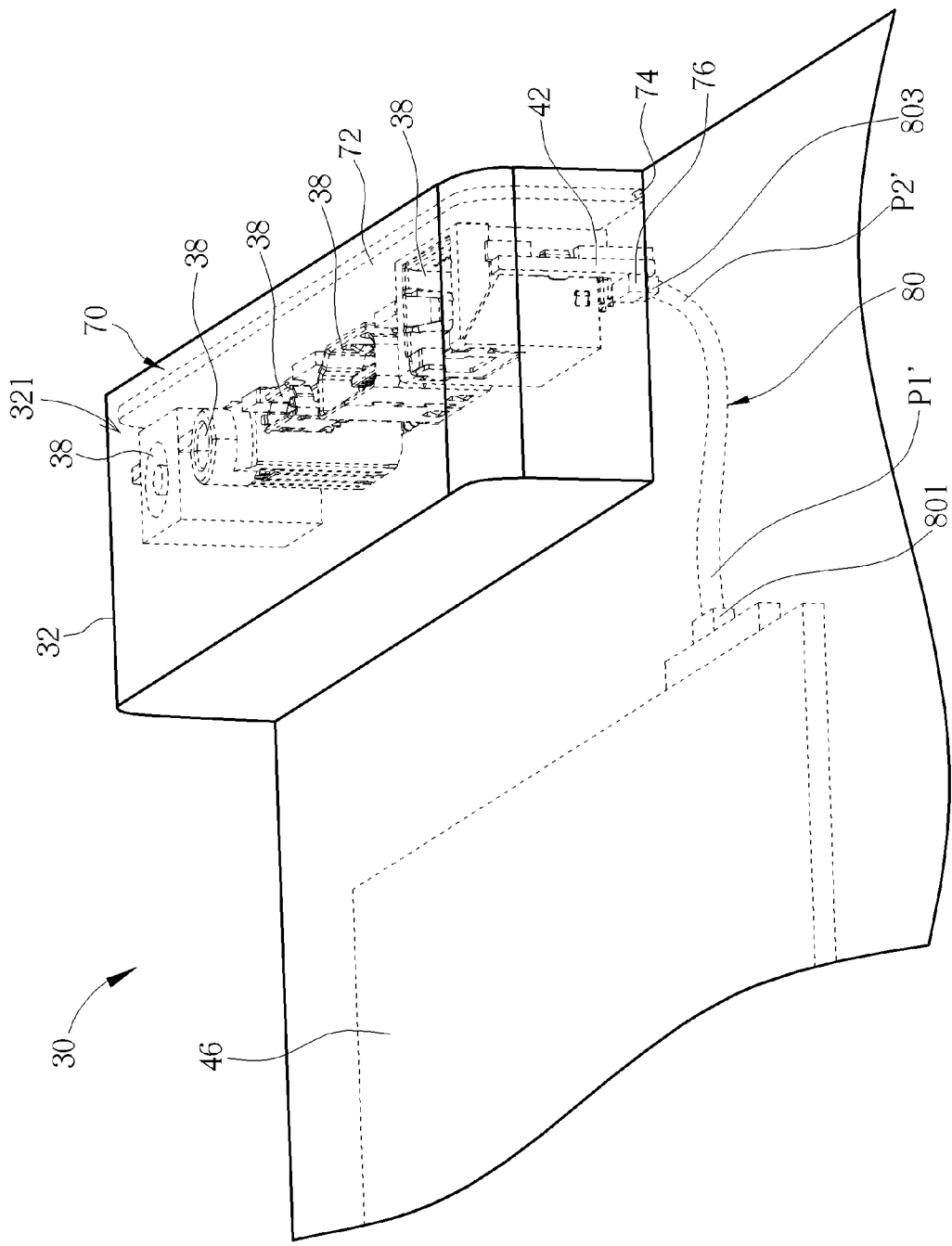
FIG. 11 is a diagram of the transmission port module in a containing status according to the second embodiment of the invention.

Please refer to FIG. 9 to FIG. 11. FIG. 9 is a diagram of a transmission port module 70 according to a second embodiment of the invention. FIG. 10 is a diagram of the transmission port module 70 in an in-use status according to the second embodiment of the invention. FIG. 11 is a diagram of the transmission port module 70 in a containing status according to the second embodiment of the invention. As shown in FIG. 9 to FIG. 11, the main difference between the transmission port module 70 and the aforesaid transmission port module 36 is that the transmission port module 70 includes a rotably holding member 72 pivoted to the casing 32 of the electronic device 30 in a position corresponding to an opening of the containing slot 321. The rotably holding member 72 is used for holding the transmission ports 38 and rotating the transmission ports 38 relative to the casing 32 of the electronic device 30.

In this embodiment, the integrated circuit board 42 is engaged with the rotably holding member 72. Since the integrated circuit board 42 is coupled to the transmission ports 38, the rotably holding member 72 is capable of holding the transmission ports 38 by engaging with the integrated circuit board 42, and further rotates the transmission ports 38 relative to the casing 32 of the electronic device 30. Designs of fixing the integrated circuit board 42 and the rotably holding member 72 are not limited to those mentioned in this embodiment. For example, the integrated circuit board 42 can be screwed on the rotably holding member 72 as well. As for which one of the above-mentioned designs is adopted, it depends on practical demands.

In addition, the transmission port module 70 further includes a pivotal shaft member 74 fixed on the rotably holding member 72. The pivotal shaft member 74 is used for pivoting the rotably holding member 72 to the casing 32 of the electronic device 30, such that the rotably holding member 72 is capable of rotating the transmission ports 38 of the transmission port module 70 relative to the casing 32 from an in-use position shown in FIG. 10 to a containing position shown in FIG. 11, or such that the rotably holding member 72 is capable of rotating the transmission ports 38 of the transmission port module 70 relative to the casing 32 from the containing position shown in FIG. 11 to the in-use position shown in FIG. 10.

In this embodiment, the pivotal shaft member 74 and the rotably holding member 72 can be, but not limited to, integrally formed. For example, the pivotal shaft member 74 and the rotably holding member 72 can be two separate parts as well, and the pivotal shaft member 74 is fixed on the rotably holding member 72 in a tight fit manner or in an inserting molding manner when assembling. In other words, structures of the pivotal shaft member 74 capable of pivoting the rotably holding member 72 to the casing 32 are within the scope of the present invention.

Furthermore, the transmission port module 70 further includes a connecting contact 76 and a transmission cable 80. The connecting contact 76 is coupled to the integrated circuit board 42, and the transmission cable 80 is disposed inside the containing slot 321 on the casing 32. As shown in FIG. 10 and FIG. 11, the transmission cable 80 has a first end P1' and a second end P2' opposite to the first end P1'. The first end P1' of the transmission cable 80 is coupled to the circuit board 46 of the electronic device 30, and the second end P2' of the transmission cable 80 is coupled to the connecting contact 76. In other words, the transmission ports 38 of the transmission port module 70 are coupled to the circuit board 46 of the electronic device 30 via the integrated circuit board 42, the connecting contact 76 and the transmission cable 80 in sequence, such that the signals can be transmitted between the transmission ports 38 and the circuit board 46 of the electronic device 30. Accordingly, the electronic device 30 can be coupled to the external electronic device, so as to enhance flexibility of the electronic device 30.

In summary, when the transmission ports 38 of the transmission port module 70 are in use, the transmission port module 70 is rotated by the rotably holding member 72 from the containing position shown in FIG. 11 to the in-use position shown in FIG. 10. In such a manner, the transmission ports 38 of the transmission port module 70 can be exposed on the casing 32, such that the electronic device 30 can be coupled to the other external electronic devices by the transmission ports 38. When the transmission ports 38 of the transmission port module 70 are not in use, the transmission port module 70 is rotated by the rotably holding member 72 from the in-use position shown in FIG. 10 to the containing position shown in FIG. 11. In such a manner, the transmission ports 38 can be hidden inside the containing slot 321, as shown in FIG. 11, so as to keep appearance integrity of the casing 32 of the electronic device 30. Accordingly, it can enhance aesthetic feeling of the electronic device 30 and further prevent objects, such as dusts, from being attached on the transmission ports 38 or entering the electronic device 30 from the transmission ports 38, so as to prevent damage of internal components of the electronic device 30 and keep the electronic device 30 functioning normally.

In this embodiment, the transmission cable 80 can further include a first connecting contact 801 and a second connecting contact 803. The first connecting contact 801 is disposed on the first end P1' of the transmission cable 80, and the second connecting contact 803 is disposed on the second end P2' of the transmission cable 80. Furthermore, the first connecting contact 801 is coupled to the circuit board 46 of the electronic device 30 in an inserting manner, and the second connecting contact 803 is coupled to the connecting contact 76 in an inserting manner. In practical application, the transmission cable 80 is a flexible printed circuit, and the first connecting contact 801 and the second connecting contact 803 are respectively a gold finger contact. Structures of the first connecting contact 801 and the second connecting contact 803 are not limited to those mentioned above. For example, the first connecting contact 801 and the second connecting contact 803 can be respectively a board-to-board connector. In other words, connectors of the first connecting contact 801 and the second connecting contact 803 capable of coupling the circuit board 46 with the connecting contact 76 are within the scope of the present invention.

Designs for coupling the transmission cable 80 with the circuit board 46 are not limited to those mentioned in this embodiment. For example, the first end P1' of the transmission cable 80 can be soldered to the circuit board 46, and the second end P2' of the transmission cable 80 can be soldered to the connecting contact 76, such that the transmission cable 80 can omit the first connecting contact 801 and the second connecting contact 803. In other words, the first connecting contact 801 and the second connecting contact 803 can be omitted in this embodiment for saving the cost of manufacture. As for which one of the above-mentioned designs is adopted, it depends on practical demands. In addition, components in the first embodiment with denotes identical to those in the second embodiment have the same structures and principles, and further descriptions are omitted herein for simplicity.

According to the first embodiment, the transmission port of the transmission port module of the present invention is disposed inside the housing, and the housing is detachably installed inside the containing slot on the casing of the electronic device. When the transmission port of the transmission port module is in use, the housing is installed inside the containing slot with the transmission port oriented towards outside of the casing of the electronic device, i.e. the first side oriented towards outside of the casing. Accordingly, the transmission port of the transmission port module is exposed on the casing for a user to use. When the transmission port of the transmission port module is not in use, the housing is installed inside the containing slot with the transmission port oriented towards inside of the casing of the electronic device, i.e. the second side oriented towards outside of the casing. Accordingly, the transmission port of the transmission port module is hidden inside the casing.

According to the second embodiment, the transmission port of the transmission port module is held on the rotably holding member, and the rotably holding member is pivoted to the casing in the position corresponding to the opening of the containing slot. When the transmission port of the transmission port module is in use, the rotably holding member rotates to the in-use position. At the same time, the transmission port of the transmission port module is exposed on the casing for a user to use. When the transmission port of the transmission port module is not in use, the rotably holding member rotates to the containing position. At the same time, the transmission port of the transmission port module is hidden inside the casing.

Compared to the prior art, the transmission port of the transmission port module of the present invention is capable of being contained inside the casing in a detachable or rotable manner as being not in sue, so as to keep appearance integrity of the casing of the electronic device. Accordingly, it can enhance aesthetic feeling of the electronic device and further prevent objects, such as dusts from being attached to the transmission port or entering the electronic device from the transmission port. As a result, it can prevent internal components of the electronic device from damage and keep the electronic device function normally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission connector module adapted to an electronic device with a casing whereon a containing slot is formed, the transmission connector module comprising:
   at least one transmission connector for transmitting signals with a circuit board disposed inside the casing; and
   a housing covering the at least one transmission connector, the housing having a first side whereon the at least one transmission connector is exposed and a second side, and the housing being installed inside the containing slot in a detachable manner, such that the at least one transmission connector is exposed on the casing when the housing is installed inside the containing slot with the first side oriented towards outside of the casing, or such that the at least one transmission connector is hidden inside the containing slot when the housing is installed inside the containing slot with the second side oriented towards outside of the casing.

2. The transmission connector module of claim 1, further comprising:
an integrated circuit board disposed inside the housing for being coupled to the at least one transmission connector.

3. The transmission connector module of claim 1, further comprising:
a connecting contact coupled to the integrated circuit board and disposed on a third side of the housing; and
a transmission cable disposed inside the containing slot, a first end of the transmission cable being coupled to the circuit board, and a second end of the transmission cable being coupled to the connecting contact when the housing is installed inside the containing slot with the first side oriented towards outside of the casing, so as to be electrically connected to the circuit board, the integrated circuit board and the at least one transmission connector.

4. The transmission connector module of claim 3, wherein the transmission cable comprises:
a first connecting contact disposed on the first end, the first connecting contact being coupled to the circuit board in an inserting manner; and
a second connecting contact disposed on the second end, the second connecting contact being coupled to the connecting contact in a tightly contacted manner.

5. The transmission connector module of claim 4, wherein the first connecting contact and the second connecting contact are respectively a gold finger contact, and the connecting contact is a spring-armed connecting contact.

6. The transmission connector module of claim 3, wherein the first end of the transmission cable is soldered to the circuit board, the transmission cable comprises a gold finger contact disposed on the second end, the connecting contact is a spring-armed connecting contact, and the gold finger contact is coupled to the spring-armed contact in a tightly contacted manner.

7. The transmission connector module of claim 3, wherein the transmission cable comprises:
a circuit board connecting portion extending from the first end;
a contact connecting portion extending from the second end, the contact connecting portion being attached to a side of the containing slot corresponding to the connecting contact; and
a bridging portion connected to the circuit board connecting portion and the contact connecting portion, the bridging portion being disposed on a lateral side of the containing slot along the housing.

8. The transmission connector module of claim 7, wherein the transmission cable is a flexible printed circuit.

9. The transmission connector module of claim 7, wherein the at least one transmission connector comprises a power supply connector, an audio jack, a Micro Universal Serial Bus, a High Definition Multimedia Interface or an Ethernet connector.

10. A transmission connector module adapted to an electronic device with a casing whereon a containing slot is formed, the transmission connector module comprising:
at least one transmission connector for transmitting signals with a circuit board disposed inside the casing; and
a rotably holding member pivoted to the casing in a position corresponding to an opening of the containing slot, the rotably holding member being for holding the at least one transmission connector and rotating the at least one transmission connector relative to the casing, such that the at least one transmission connector is exposed towards outside of the casing when the rotably holding member rotates to an in-use position, or such that the at least one transmission connector is hidden inside the containing slot when the rotably holding member rotates to a containing position.

11. The transmission connector module of claim 10, further comprising:
an integrated circuit board coupled to the at least one transmission connector, the integrated circuit board being engaged with the rotably holding member, such that the rotably holding member holds the at least one transmission connector and rotates the at least one transmission connector relative to the casing.

12. The transmission connector module of claim 11, further comprising:
a connecting contact coupled to the integrated circuit board; and
a transmission cable disposed inside the containing slot, a first end of the transmission cable being coupled to the circuit board, and a second end of the transmission cable being coupled to the connecting contact, so as to be electrically connected to the circuit board, the integrated circuit board and the at least one transmission connector.

13. The transmission connector module of claim 12, wherein the transmission cable comprises:
a first connecting contact disposed on the first end, the first connecting contact being coupled to the circuit board in an inserting manner; and
a second connecting contact disposed on the second end, the second connecting contact being coupled to the connecting contact in an inserting manner.

14. The transmission connector module of claim 13, wherein the first connecting contact and the second connecting contact are respectively a gold finger contact.

15. The transmission connector module of claim 14, wherein the transmission cable is a flexible printed circuit.

16. The transmission connector module of claim 12, wherein the first end of the transmission cable is soldered to the circuit board, and the second end of the transmission cable is soldered to the connecting contact.

17. The transmission connector module of claim 16, further comprising:
a pivotal shaft member fixed on the rotably holding member for pivoting the rotably holding member to the casing.

18. The transmission connector module of claim 17, wherein the at least one transmission connector comprises a power supply connector, an audio jack, a Micro Universal Serial Bus, a High Definition Nultimedia Interface or an Ethernet connector.

* * * * *

UNITED STATES PATENT AND TRADEMARK OFFICE
CERTIFICATE OF CORRECTION

PATENT NO.        : 8,876,545 B2
APPLICATION NO.   : 13/775085
DATED             : November 4, 2014
INVENTOR(S)       : Tien-Chung Tseng et al.

It is certified that error appears in the above-identified patent and that said Letters Patent is hereby corrected as shown below:

On the Title page, item (54), and in the Specification, at Column 1, lines 1-4, correct the invention title from "TRANSMISSION CONNECTOR MODULE CONTAINABLE INSIDE A CASING OF A ELECTRONIC DEVICE IN A DETACHABLE MANNER OR IN A ROTABLE MANNER" to --TRANSMISSION CONNECTOR MODULE CONTAINABLE INSIDE A CASING OF AN ELECTRONIC DEVICE IN A DETACHABLE MANNER OR IN A ROTABLE MANNER--.

Signed and Sealed this
Nineteenth Day of May, 2015

Michelle K. Lee
*Director of the United States Patent and Trademark Office*